US012694589B2

(12) United States Patent
Harada et al.

(10) Patent No.: US 12,694,589 B2
(45) Date of Patent: Jul. 28, 2026

(54) ASSISTANCE DEVICE, METHOD FOR ASSISTING IN DESIGN, AND COMPUTER PROGRAM

(71) Applicant: KABUSHIKI KAISHA TOYOTA CHUO KENKYUSHO, Nagakute (JP)

(72) Inventors: Takumi Harada, Nagakute (JP); Hiroyuki Sakai, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 147 days.

(21) Appl. No.: 18/852,266

(22) PCT Filed: Nov. 18, 2022

(86) PCT No.: PCT/JP2022/042834
§ 371 (c)(1),
(2) Date: Sep. 27, 2024

(87) PCT Pub. No.: WO2023/195198
PCT Pub. Date: Oct. 12, 2023

(65) Prior Publication Data
US 2026/0187853 A1 Jul. 2, 2026

(30) Foreign Application Priority Data
Apr. 8, 2022 (JP) ................................. 2022-064305

(51) Int. Cl.
*G06T 11/00* (2026.01)
(52) U.S. Cl.
CPC .................................... *G06T 11/00* (2013.01)

(58) Field of Classification Search
CPC .......... G06T 11/00; G06T 11/20; G06T 11/26; G06T 11/60; G06T 11/65; G06T 15/00; G06T 17/00; G06T 19/00; G06T 19/20
See application file for complete search history.

(56) References Cited

U.S. PATENT DOCUMENTS

| | | | |
|---|---|---|---|
| 12,070,274 B2 * | 8/2024 | Roh | A61B 34/10 |
| 12,535,670 B2 * | 1/2026 | Blanchard | C12M 41/36 |

(Continued)

FOREIGN PATENT DOCUMENTS

| | | |
|---|---|---|
| JP | 2015-114946 A | 6/2015 |
| JP | 2017-157110 A | 9/2017 |

(Continued)

OTHER PUBLICATIONS

Shradha Agrawal et al. "Directional GAN: a Novel Conditioning Strategy for Generative Networks". May 13, 2021.

(Continued)

*Primary Examiner* — Vijay Shankar
(74) *Attorney, Agent, or Firm* — Oliff PLC

(57) ABSTRACT
A design assistance device includes an acquisition unit that acquires an initial image and a condition for image generation, and an image generation unit that generates a candidate image. The candidate image is a candidate of an image resulting from changing an impression of the acquired initial image. The device further includes an image determination unit that causes the image generation unit to repeatedly generate the candidate image until the candidate image generated by the image generation unit satisfies the condition, and an output control unit that causes the candidate image which satisfies the condition to be output.

11 Claims, 7 Drawing Sheets

(56) References Cited

U.S. PATENT DOCUMENTS

| | | | | |
|---|---|---|---|---|
| 2024/0104701 A1* | 3/2024 | Ramsay | .................... | G06T 5/70 |
| 2024/0362779 A1* | 10/2024 | Machii | .................. | G06T 7/0012 |
| 2025/0009432 A1* | 1/2025 | Roh | ....................... | A61B 34/20 |
| 2026/0044953 A1* | 2/2026 | Attili | .................... | G06T 7/0012 |

FOREIGN PATENT DOCUMENTS

| | | |
|---|---|---|
| JP | 2020-091665 A | 6/2020 |
| JP | 2020-154844 A | 9/2020 |
| JP | 2021-120801 A | 8/2021 |
| JP | 2021-168078 A | 10/2021 |

OTHER PUBLICATIONS

Feb. 7, 2023 International Search Report issued in International Patent Application No. PCT/JP2022/042834.
Apr. 26, 2024 Office Action issued in Japanese Patent Application No. 2022-064305.

\* cited by examiner

Fig. 2

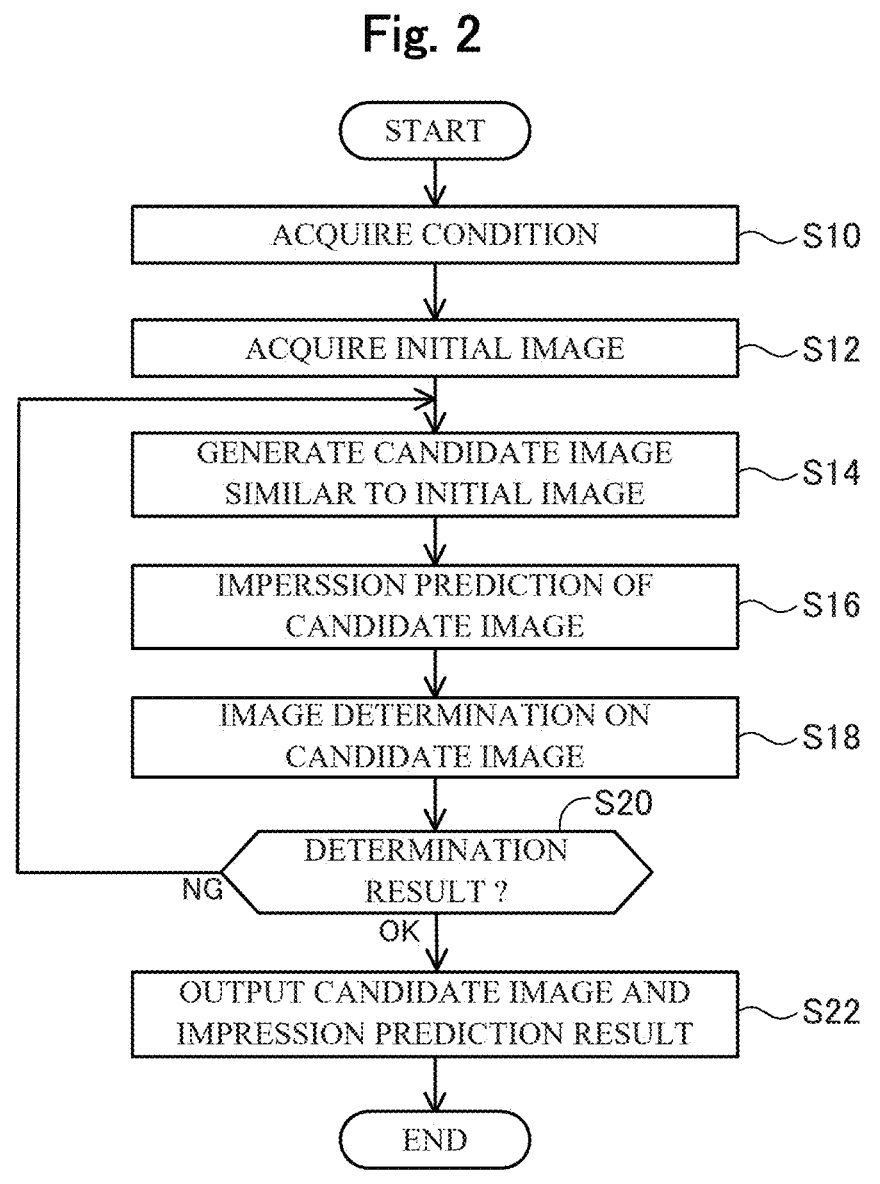

START

ACQUIRE CONDITION — S10

ACQUIRE INITIAL IMAGE — S12

GENERATE CANDIDATE IMAGE SIMILAR TO INITIAL IMAGE — S14

IMPERSSION PREDICTION OF CANDIDATE IMAGE — S16

IMAGE DETERMINATION ON CANDIDATE IMAGE — S18

S20

DETERMINATION RESULT ?

NG

OK

OUTPUT CANDIDATE IMAGE AND IMPRESSION PREDICTION RESULT — S22

END

Fig. 6

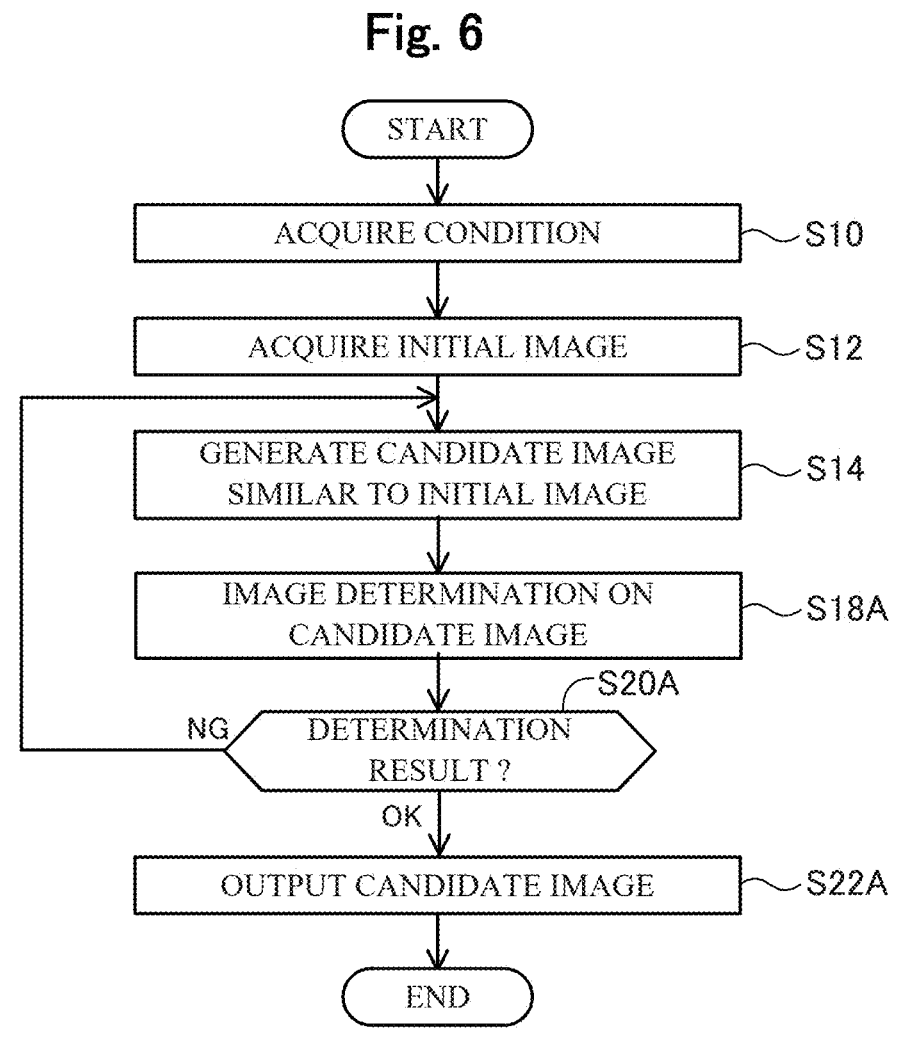

```
            ┌──────────┐
            │  START   │
            └──────────┘
                 │
                 ▼
   ┌────────────────────────────┐
   │     ACQUIRE CONDITION       │───S10
   └────────────────────────────┘
                 │
                 ▼
   ┌────────────────────────────┐
   │    ACQUIRE INITIAL IMAGE    │───S12
   └────────────────────────────┘
                 │
      ┌──────────▼──────────────┐
      │  GENERATE CANDIDATE IMAGE│───S14
      │   SIMILAR TO INITIAL IMAGE│
      └──────────┬──────────────┘
                 │
      ┌──────────▼──────────────┐
      │  IMAGE DETERMINATION ON  │───S18A
      │     CANDIDATE IMAGE      │
      └──────────┬──────────────┘
                 │          ┌─S20A
          NG  ╱  ▼          
          ◁───  DETERMINATION  ▷
                 RESULT ?
                 │ OK
                 ▼
   ┌────────────────────────────┐
   │   OUTPUT CANDIDATE IMAGE    │───S22A
   └────────────────────────────┘
                 │
                 ▼
            ┌──────────┐
            │   END    │
            └──────────┘
```

ASSISTANCE DEVICE, METHOD FOR ASSISTING IN DESIGN, AND COMPUTER PROGRAM

This application is a National Stage of International Application No. PCT/JP2022/042834 filed Nov. 18, 2022, which is based upon and claims the benefit of priority from Japanese Patent Application No. 2022-064305 filed Apr. 8, 2022, the entire contents of the prior applications being incorporated herein by reference.

TECHNICAL FIELD

The present disclosure relates to a design support technique.

BACKGROUND ART

Various devices capable of automatically generating images (designs) are known. For example, Patent Literature 1 and Non-Patent Literature 1 each describe a device to generate an image according to a condition designated by a user (taste for design or desired attribute in a face image). For example, Patent Literatures 2 to 4 each describe a device to generate novel images or unique images using cycle-consistent generative adversarial networks (CycleGAN).

CITATION LIST

Patent Literature

Patent Literature 1: JP 2020-91665 A
Patent Literature 2: JP 2021-120801 A
Patent Literature 3: JP 2021-168078 A
Patent Literature 4: JP 2020-154844 A

Non-Patent Literature

Non-Patent Literature 1: Shradha Agrawal, Shankar Venkitachalam, Dhanya Raghu, Deepak Pai, "Directional GAN: A Novel Conditioning Strategy for Generative Networks", May 13, 2021, arXiv:2105.05712v2.

SUMMARY

Technical Problem

It is known that emotions of people have a great influence on cognitive functions, and specifically, on memory, thinking, problem solving, decision making, attentiveness, and the like. Since images directly act on human emotions through vision, manipulating an "impression" that a person receives upon viewing an image is significant in a device that automatically generates images (designs). In this regard, none of the techniques described in Patent Literatures 1 to 4 and Non-Patent Literature 1 considers generation of an image taking an impression into account.

The present disclosure is made to solve at least a part of the above-described problems, and an object thereof is to provide a technique capable of generating an image taking an impression into account.

Solution to Problem

The present disclosure is made to solve at least a part of the above-described problems, and may be implemented as the following aspect.

(1) According to an aspect of the present disclosure, a design assistance device is provided. This design assistance device includes: an acquisition unit that acquires an initial image and a condition for image generation; an image generation unit that generates a candidate image, being a candidate of an image resulting from changing an impression of the acquired initial image; an image determination unit that causes the image generation unit to repeatedly generate the candidate image until the candidate image generated by the image generation unit satisfies the condition; and an output control unit that causes the candidate image which satisfies the condition to be output.

According to this configuration, the image generation unit generates a candidate image, being a candidate of an image resulting from changing an impression of the acquired initial image, and the image determination unit causes the image generation unit to repeatedly generate the candidate image until the candidate image generated by the image generation unit satisfies the condition. In other words, according to the design assistance device having the present configuration, various candidate images whose impression is varied are generated until the candidate image which satisfies the condition is acquired, which enables generation of an image taking an impression into account.

(2) In the design assistance device according to the above aspect, it is also possible that the condition includes a parameter item and item content regarding an impression parameter defining image impression, the design assistance device further includes: an impression predicting unit that predicts an impression of the candidate image generated by the image generation unit, regarding the parameter item, and when the impression regarding the parameter item predicted by the impression predicting unit satisfies the item content regarding the parameter item designated by the condition, the image determination unit determines that the candidate image satisfies the condition.

According to this configuration, the condition for image generation includes the parameter item and item content regarding an impression parameter defining image impression. Therefore, the impression predicting unit can predict an impression of a candidate image according to the parameter item, and the image determination unit can determine whether a candidate image satisfies the condition by using the item content. As a result, the design assistance device having the present configuration can generate an image which has an impression designated by the condition. In addition, according to the present configuration, an image is acquired by editing an impression parameter, which is a so-called psychological feature parameter (parameter which does not represent a physical feature), and therefore no trials and errors are required until a desired image is acquired as compared to known software which acquires an image by editing physical feature parameters such as "RGB value, hue, chroma, brightness, etc. of an image", which shortens a time to acquire an image desired by a user. Furthermore, the present configuration requires no knowledge about the physical feature parameters as compared to the known software (e.g., technical knowledge on how much change is rendered in an acquired image by changing the RGB value by a certain amount), and an image can be generated by means of more intuitive impression parameters. Furthermore, the known software requires combination of a plurality of different physical feature parameters to acquire an image desired by a user. However, the number of changeable physical feature parameters is enormous, which increasingly complicates the parameter adjusting operations. In regard to this point, free from the above-stated problem of the known software, the present configuration can generate an image having an impression designated by the condition.

(3) In the design assistance device according to the above aspect, the parameter item may include at least one or more of: valence for defining a qualitative difference of evoked emotion; arousal for defining a level of physical and cognitive arousal caused by emotion; and aesthetics for defining a level of aesthetic appearance visually sensed.

According to this configuration, the parameter item includes at least one or more of the valence for defining a qualitative difference of evoked emotion; the arousal for defining a level of physical and cognitive arousal caused by emotion; and the aesthetics for defining a level of aesthetic appearance visually sensed. Therefore, a user can designate an impression itself (impression per se) as the condition. In addition, by including the valence in the parameter item, an impression evoking positive emotion (for example, pleasance, joy) and an impression evoking negative emotion (for example, discomfort, sadness) can be defined. In addition, by including the arousal in the parameter item, an impression evoking excitement and an impression evoking sedation can be defined. Here, generally speaking, "emotion" affecting a person's cognitive function is known to be represented in two dimensions of the valence and the arousal. For this reason, by including both the valence and the arousal in the parameter item, an image having an impression more effectively appealing to emotion of a person who viewed the image can be generated. Furthermore, by including the aesthetics in the parameter item, a level of aesthetic appearance of the image can be determined.

(4) In the design assistance device according to the above aspect, the output control unit may further cause the impression predicted by the impression predicting unit to be output, in addition to the candidate image.

According to this configuration, the output control unit causes an impression predicted by the impression predicting unit to be further output, in addition to the candidate image. For this reason, the user can also take into account the prediction result of the impression predicting unit, in addition to the impression actually sensed by viewing the output candidate image. As a result, the usability of the design assistance device can be further improved.

(5) In the design assistance device according to the above aspect, it is also possible that the condition further includes a number of generation of the candidate image, and the image determination unit further causes the image generation unit to repeatedly generate the candidate image until the candidate image which satisfies the condition is generated in number designated by the number of generation.

According to this configuration, the image determination unit further repeatedly causes candidate image generation by the image generation unit until the candidate images which satisfy the condition are generated in number designated by the number of generation. As a result, the design assistance device having the present configuration can generate the images in number designated by the condition, which allows an image (design) beyond the user's imagination to be acquired by generation and presentation of many candidate images.

(6) In the design assistance device according to the above aspect, it is also possible that the condition includes item content representing a similarity level allowed between the initial image and the candidate image generated by the image generation unit, and when a similarity level of the candidate image generated by the image generation unit with respect to the initial image satisfies the item content designated by the condition, the image determination unit determines that the candidate image satisfies the condition.

According to this configuration, the condition for image generation includes item content representing a similarity level allowed between the initial image and the candidate image. For this reason, the image determination unit can determine whether the candidate image satisfies the condition by using the item content. As a result, according to the design assistance device having the present configuration, the image having the similarity level designated by the condition can be generated.

The present disclosure can be implemented in various aspects, and for example can be realized by such aspects as a design assistance device, an information processing device, an image generating device, image generation display device, a method performed in the information processing device to realize functions of these devices, a system including these devices, a computer program to realize functions of these devices and the system, a server device to distribute such computer program, and a non-temporary storage medium storing therein such computer program.

BRIEF DESCRIPTION OF DRAWINGS

FIG. 2 is a flowchart illustrating an example of a processing procedure of image generating processing.

FIG. 6 is a flowchart illustrating an example of a processing procedure of image generating processing according to the second embodiment.

DETAILED DESCRIPTION OF EMBODIMENTS

First Embodiment

Figure 1:
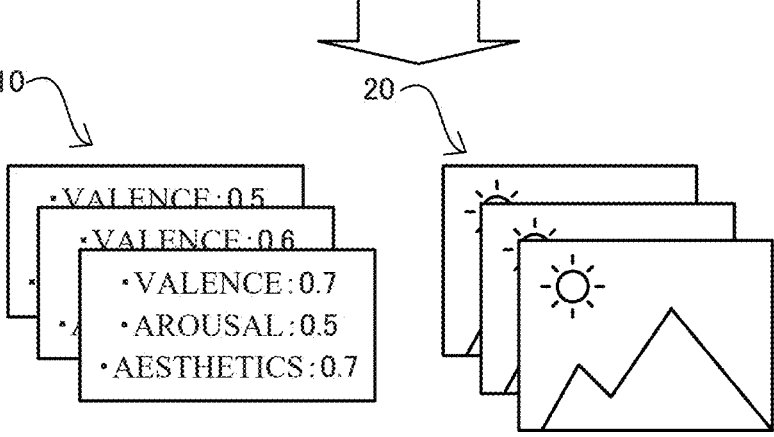
FIG. 1 is a schematic view of a design assistance device as an embodiment of the present disclosure.

FIG. 1 is a schematic view of a design assistance device 100 as an embodiment of the present disclosure. The design assistance device 100 is a device that generates, from a condition 1 and an initial image 2 designated by a user, a candidate image 20 that is a candidate of an image which meets to the condition 1 and which results from changing the impression of the initial image 2, and outputs the candidate image 20. The design assistance device 100 can be configured as a server device that provides a service to a user via a network. A user terminal (PC or smartphone) may function as the design assistance device 100, by installation of a predetermined application in the user terminal. The examples hereinafter deal with the design assistance device 100 as a server device.

The design assistance device 100 includes a CPU 110, a storage 120, a communicating unit 130, and ROM/RAM 140, and each unit is coupled to one another by a bus. The CPU 110 controls each unit of the design assistance device 100 by loading, onto the RAM 140, a computer program stored in the ROM 140 and executing the computer program. The CPU 110 also functions as a condition acquisition unit 111, an image acquisition unit 112, an image generation unit 113, an impression predicting unit 114, an image determination unit 115, and an output control unit 116.

The condition acquisition unit 111 acquires a condition 1 designated by a user, from a terminal of the user via a network, in later-described image generating processing. In the present embodiment, the condition 1 includes a parameter item and item content regarding an impression parameter. Herein, the "impression parameter" is a parameter for defining an impression which a person receives upon viewing an image (hereinafter also referred to as "image impression"). In the present embodiment, all the following a1 to a3 are included as the parameter items of the impression parameter.

(a1) Valence: Scale for defining qualitative difference of evoked emotion

In the present embodiment, the valence is represented by a numerical value of 0 or more and 1 or less, and represents more negative emotion (for example, discomfort, sadness) as being closer to 0 and represents more positive emotion (for example, pleasance, joy) as being closer to 1.

(a2) Arousal: Scale for defining a level of physical and cognitive arousal caused by emotion In the present embodiment, arousal is represented by a numerical value of 0 or more and 1 or less, and represents a state of higher sedation as being closer to 0 and represents a state of higher excitement as being closer to 1.

(a3) Aesthetics: Scale for defining a level of aesthetic appearance visually sensed In the present embodiment, the aesthetics is represented by a numerical value of 0 or more and 1 or less, and represents low aesthetics (for example, disfigured) as being closer to 0, and represents higher aesthetics (for example, beautiful) as being closer to 1.

The condition 1, as illustrated in FIG. 1, includes, together with the parameter items a1 to a3, item content corresponding to each of parameter items a1 to a3. In the example of FIG. 1, 0.7 is designated for the item content for valence, 0.5 is designated for item content for arousal, and 0.7 is designated for item content for aesthetics. The item content illustrated in FIG. 1 is merely an example. In this way, the parameter items in the condition 1 (items a1 to a3 themselves) represent based on which criteria a user desires to manipulate the image impression. The item content for condition 1 (i.e., 0.7, 0.5, 0.7) represents which impression the image to be acquired desirably has under the criteria defined by the parameter item.

The condition 1 may include, instead of the parameter items a1 to a3 for the impression parameter, the other parameter items as exemplified by the following b1, b2 and the item content corresponding to the parameter items b1, b2.

(b1) Impression level: Scale for defining a degree of ease of remaining in memory In the present embodiment, the impression level is represented by a numerical value of 0 or more and 1 or less, and represents lower ease of remaining in memory (e.g., weak impression) as being closer to 0, and represents higher ease of remaining in memory (e.g., impressive) as being closer to 1.

(b2) Attractive level: Scale for defining a level of attractiveness

In the present embodiment, the attractive level is represented by a numerical value of 0 or more and 1 or less, and represents a state in which attractiveness is lower as being closer to 0, and represents a state in which attractiveness is higher (e.g., a state of attracting more people) as being closer to 1.

The condition 1 may include, in addition to the impression parameter items a1 to a3, b1, and b2 and the item content corresponding to the impression parameter items a1 to a3, b1, and b2, any additional conditions exemplified by the following conditions c1 and c2.

(c1) Number of image generation: Designation of the number of images output in image generating processing, which is any natural number (c2) Whether candidate images can be similar to each other: Designation as to whether a plurality of candidate images can be similar to each other, if such plurality of candidate images are generated in image generating processing (i.e., in a case where the item c1 is 2 or more)

The image acquisition unit 112 acquires an initial image 2 designated by a user, from a terminal of the user via a network, in later-described image generating processing. As the initial image 2, any image of a user (e.g., face photograph, landscape photograph, illustration, or the like) can be designated. The condition acquisition unit 111 and the image acquisition unit 112 function as an "acquisition unit".

The image generation unit 113 generates a candidate of an image (hereinafter also referred to as "candidate image") resulting from changing the impression of the initial image 2, by using the initial image 2, in the later-described image generating processing. The impression predicting unit 114 predicts the impression of the candidate image in the later-described image generating processing. The image determination unit 115 causes the image generation unit 113 to repeatedly generate candidate images in the later-described image generating processing, until the candidate image satisfies the condition 1 designated by the user. The output control unit 116 transmits the candidate image 20 which satisfies the condition 1 via the network, thereby outputting the result in the terminal of the user. The details of processing in the image generation unit 113, the impression predicting unit 114, the image determination unit 115, and the output control unit 116 is described later.

The storage 120 is constituted by a flash memory, a memory card, a hard disk, or the like. The storage 120 stores, in advance, an image generating model 121 and an impression predicting model 122. The image generating model 121 is a pre-trained model used to generate an image, and is implemented by a generative adversarial network (GAN). The impression predicting model 122 is a pre-trained model used to predict an image impression. The impression predicting model 122 can be implemented as a neural network, with an image as an input, and with, as an output, the evaluated values for the impression parameter items a1 to a3 of the condition 1.

The communicating unit 130 controls communication with another device, which is via a communication interface not illustrated. Another device includes the terminal of the user, and any other server or the like, not illustrated. The design assistance device 100 may include input/output units not illustrated. As an input unit, a touch panel, a keyboard, a mouse, a voice input device, or the like, can be adopted. As an output unit, a touch panel, a monitor, a voice output device, or the like, can be adopted.

FIG. 2 is a flowchart illustrating an example of a processing procedure of image generating processing. The image generating processing is processing to generate a candidate image 20 that meets the condition 1, and outputs the candidate image 20, and is performed by the design assistance device 100. The image generating processing can be started by any trigger. For example, the image generating processing may be performed triggered by starting of a predetermined application installed in the terminal of the user.

In step S10, the condition acquisition unit 111 acquires the condition 1 (the above-described parameter item and item content for the impression parameter) transmitted from the terminal of the user via the network. In step S12, the image acquisition unit 112 acquires the initial image 2 transmitted from the terminal of the user via the network. Steps S10 and S12 may be performed in an order reverse to the order described above, or may be performed at once (simultaneously).

Figure 3A:
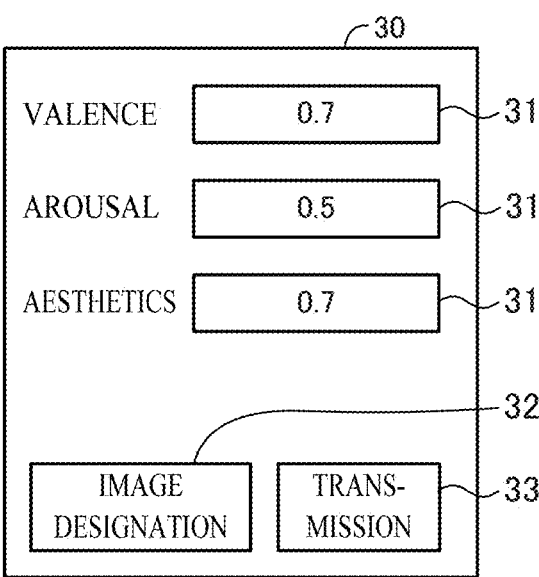
FIGS. 3A and 3B are each an explanatory drawing of an acquisition screen.
Figure 3B:
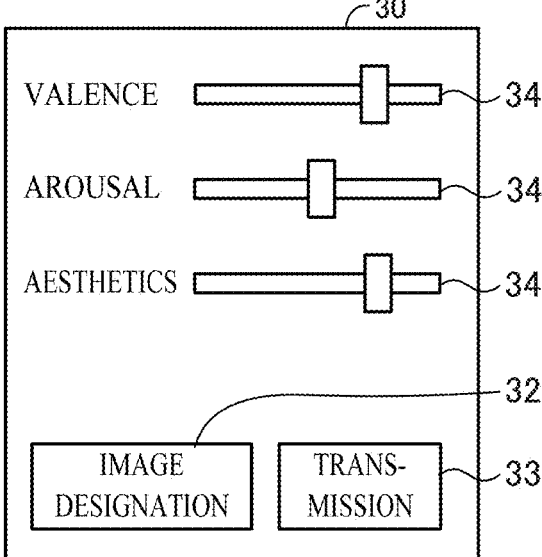

FIGS. 3A and 3B are each an explanatory drawing of an acquisition screen. FIG. 3A illustrates an example of the acquisition screen, and FIG. 3B illustrates another example of the acquisition screen. In steps S10, S12, the condition acquisition unit 111 may cause the terminal of the user to display the acquisition screen 30 for acquiring the condition 1 and the initial image 2. In the example of FIG. 3A, the acquisition screen 30 includes: a character input box 31 for the user to input each of pieces of item content for the impression parameter items a1 to a3 (valence, arousal, aesthetics); an image designation button 32 to designate the initial image 2; and a transmission button 33 to transmit these pieces of input content to the design assistance device 100. In the example of FIG. 3B, each of pieces of item content for the impression parameter items a1 to a3 (valence, arousal, aesthetics) can be input, not through the character input box 31 but through the slider bar 34. When the slider bar 34 is used, more intuitive input can be realized. In place of the slider bar, a radio button for selection, or the like, may be used to select one from multiple stages.

In step S14, the image generation unit 113 generates a candidate of an image (hereinafter also referred to as "candidate image") which is similar to the initial image 2 acquired in step S12 and which results from changing the impression of the initial image 2. Specifically, the image generation unit 113 estimates a latent variable, being an input variable for the image generating model 121, by using the initial image 2, and inputs the estimated latent variable to the image generating model 121. The image generation unit 113 acquires the image output from the image generating model 121 (i.e., the image resulting from changing the impression of the initial image 2 according to the input latent variable), and sets the image as a candidate image. Estimation of the latent variable can be performed by any known optimization calculation.

In step S16, the impression predicting unit 114 predicts an impression of the candidate image generated in step S14. Specifically, the impression predicting unit 114 inputs the generated candidate image to the impression predicting model 122. As described above, the impression predicting model 122 is a neural network, with an image as an input, and with, as an output, the evaluated value for the impression parameter items a1 to a3 of the condition 1. Therefore, the impression predicting unit 114 acquires the evaluated value output from the impression predicting model 122, and sets this evaluated value as a predicted impression (hereinafter also referred to as "impression prediction result").

In step S18, the image determination unit 115 performs image determination on the candidate image, by using the impression prediction result acquired in step S16. Specifically, when the impression prediction result acquired in step S16 (in detail, the evaluated values of impressions about the impression parameter items a1 to a3 predicted by the impression predicting unit 114) satisfies the item content for the impression parameter items a1 to a3 designated by the condition 1 (0.7, 0.5, 0.7 in the example of FIG. 1), the image determination unit 115 determines that the candidate image satisfies the condition 1. Here, the image determination unit 115 determines that the candidate image satisfies the condition 1 not only when the impression prediction result "matches" the item content for the condition 1, but also when the impression prediction result "is close to" the item content for the condition 1. The image determination unit 115 can determine whether the impression prediction result is close to the item content for the condition 1, by using information on a distance (or distance information) between the impression prediction result and the item content for the condition 1.

In step S20, the image determination unit 115 determines whether the impression prediction result satisfies the item content for the condition 1 (in other words, whether the impression prediction result is close to the item content for the condition 1). If the condition 1 is satisfied (in step S20: OK), the image determination unit 115 transmits the candidate image to the output control unit 116, and transitions the processing to step S22. If the condition 1 is not satisfied in step S20 (in step S20: NG), the image determination unit 115 transitions the processing to step S14, and repeatedly causes generation of the candidate images by the image generation unit 113, impression prediction by the impression predicting unit 114, and image determination by the image determination unit 115. During this process, the image determination unit 115 transmits (feeds back), to the image generation unit 113, distance information between the impression prediction result and the item content for the condition 1. The image generation unit 113 decides the latent variable by using the fed back distance information in step S14 performed again, thereby generating a candidate image which is close to the item content for the condition 1.

In step S22, the output control unit 116 transmits, to the terminal of the user, the candidate image acquired from the image determination unit 115, and the impression prediction result acquired from the impression predicting unit 114 (the evaluated value for the impression regarding the impression parameter items a1 to a3 predicted by the impression predicting unit 114 in step S16). As a result, as illustrated in FIG. 1, the candidate image 20 and the impression prediction result 10 are output to the terminal of the user.

When the condition 1 includes the additional condition c1 (number of image generation), the image determination unit 115 may repeatedly perform steps S14 to S20, until the candidate images which satisfy the item content for the impression parameter items a1 to a3 designated by the condition 1 are generated in number designated by the additional condition c1. By doing so, as illustrated in FIG. 1, a plurality of (three in the example of the drawing) candidate images 20 and impression prediction results 10 are output to the terminal of the user.

When the condition 1 includes the additional condition c2 (whether candidate images can be similar to each other), the image determination unit 115 may repeatedly perform steps S14 to S20, until the candidate images which satisfy the item content for the impression parameter items a1 to a3 designated by the condition 1 are generated in number designated by the additional condition c1, and until a similarity level of each candidate image conforms to content designated by the additional condition c2. The image determination unit 115 may evaluate the similarity level of the images, by using learned perceptual image patch similarity (LPIPS), feature point matching, histogram comparison, etc. The image determination unit 115 may transmit (feedback) the evaluation result of the similarity level between the images, in addition to the distance information between the impression prediction result and the item content for the condition 1, in step S20.

Figure 4:
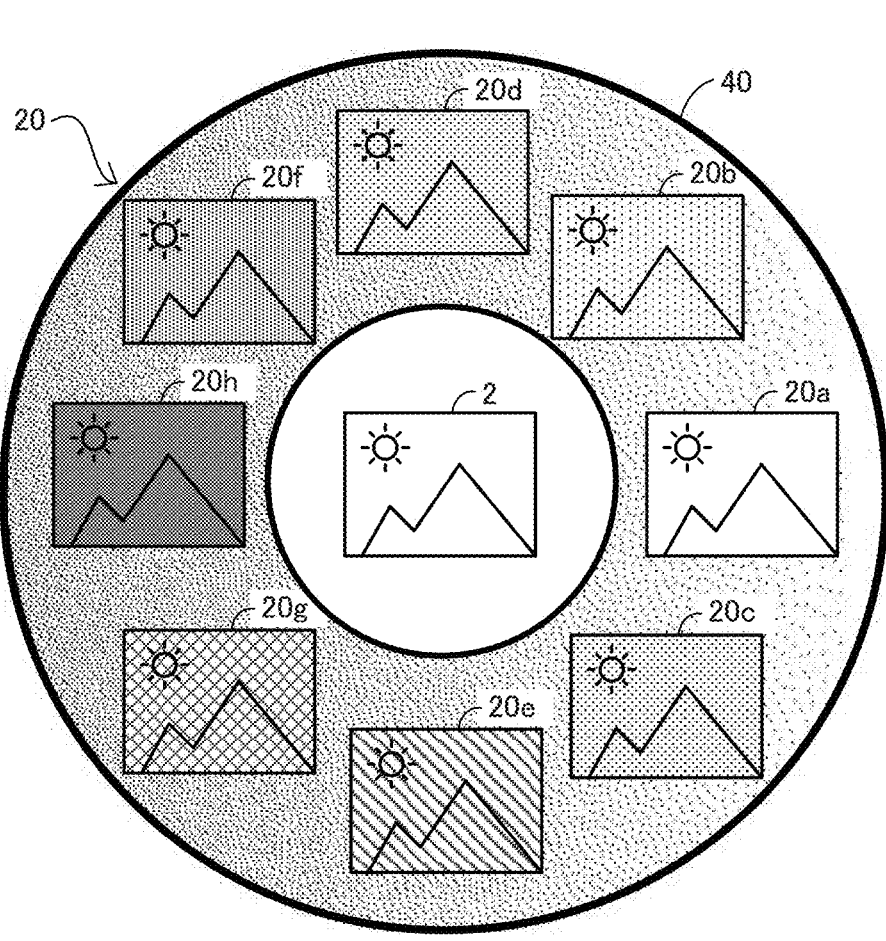
FIG. 4 illustrates an example of an output mode of a candidate image.

FIG. 4 illustrates an example of an output mode of a candidate image 20. In step S22 of FIG. 2, the output control unit 116 may cause the candidate image 20 to be output (displayed) in the mode as illustrated in FIG. 4. In the example of FIG. 4, the initial image 2 designated by the user is disposed in the center of an annular circle 40. On the annulus of the circle 40, a plurality of candidate images 20 generated in the image generating processing are disposed. The example of FIG. 4 exemplifies the case of the additional condition c1, namely, the number of image generations=8, in which each image is disposed in such a manner that candidate images 20 whose valence is closer to 0 (negative) are arranged towards the left side of the annulus, and that candidate images 20 whose valence is closer to 1 (positive) are arranged towards the right side of the annulus. In the example of FIG. 4, the shapes of the objects (sun and mountain) included in the images are the same. However, the design assistance device 100 may change the shapes themselves of the objects included in the images.

As described so far, according to the design assistance device 100 according to the first embodiment, the image generation unit 113 generates a candidate image, being a candidate of an image resulting from changing the impression of the acquired initial image 2, and the image determination unit 115 causes the image generation unit 113 to repeatedly generate candidate images, until the candidate image generated by the image generation unit 113 satisfies the condition 1. In other words, the design assistance device 100 generates various candidate images whose impression is varied, until the candidate image 20 which satisfies the condition 1 is acquired, which enables generation of an image taking an impression into account.

According to the design assistance device 100 according to the first embodiment, the condition 1 for image generation includes parameter items a1 to a3 and item content regarding an impression parameter defining image impression. Therefore, the impression predicting unit 114 can predict an impression of a candidate image according to the parameter items a1 to a3, and the image determination unit 115 can determine whether a candidate image satisfies the condition 1 by using the item content. As a result, the design assistance device 100 can generate an image 20 which has an impression designated by the condition 1. In addition, according to the design assistance device 100, an image is acquired by editing an impression parameter, which is a so-called psychological feature parameter (parameter which does not represent a physical feature), and therefore no trials and errors are required until a desired image is acquired as compared to known software which acquires an image by editing physical feature parameters such as "RGB value, hue, chroma, brightness, etc. of an image", which shortens a time to acquire an image 20 desired by a user. Furthermore, the design assistance device 100 requires no knowledge about the physical feature parameters as compared to the known software (e.g., technical knowledge on how much change is rendered in an acquired image by changing the RGB value by a certain amount), and an image can be generated by means of more intuitive impression parameters. Furthermore, the known software requires combination of a plurality of different physical feature parameters to acquire an image desired by a user. However, the number of changeable physical feature parameters is enormous, which increasingly complicates the parameter adjusting operations. In regard to this point, free from the above-stated problem of the known software, the design assistance device 100 can generate an image 20 having an impression designated by the condition.

Still further, according to the design assistance device 100 according to the first embodiment, the parameter items a1 to a3 include at least one or more of the valence a1 for defining a qualitative difference of evoked emotion; the arousal a2 for defining a level of physical and cognitive arousal caused by emotion; and the aesthetics a3 for defining a level of aesthetic appearance visually sensed. Therefore, a user can designate an impression itself (impression per se) as the condition 1. In addition, by including the valence a1 in the parameter items a1 to a3, an impression evoking positive emotion (for example, pleasance, joy) and an impression evoking negative emotion (for example, discomfort, sadness) can be defined. In addition, by including the arousal a2 in the parameter items a1 to a3, an impression evoking excitement and an impression evoking sedation can be defined. Here, generally speaking, "emotion" affecting a person's cognitive function is known to be represented in two dimensions of the valence a1 and the arousal a2. For this reason, by including both the valence a1 and the arousal a2 in the parameter items a1 to a3, an image 20 having an impression more effectively appealing to emotion of a person who viewed the image can be generated. Furthermore, by including the aesthetics a3 in the parameter items a1 to a3, a level of aesthetic appearance of the image can be determined.

Furthermore, according to the design assistance device 100 according to the first embodiment, the output control unit 116 causes an impression (impression prediction result 10) predicted by the impression predicting unit 114 to be further output, in addition to the candidate image 20. For this reason, the user can also take into account the impression prediction result 10 of the impression predicting unit 114, in addition to the impression actually sensed by viewing the output candidate image 20. As a result, the usability of the design assistance device 100 can be further improved.

According to the design assistance device 100 according to the first embodiment, the image determination unit 115 further repeatedly causes candidate image generation by the image generation unit 113 until the candidate images 20 which satisfy the condition 1 are generated in number designated by the number of generation in the additional condition c1. As a result, the design assistance device 100 can generate the images 20 in number designated by the condition 1, which allows an image (design) beyond the user's imagination to be acquired by generation and presentation of many candidate images 20.

Second Embodiment

Figure 5:
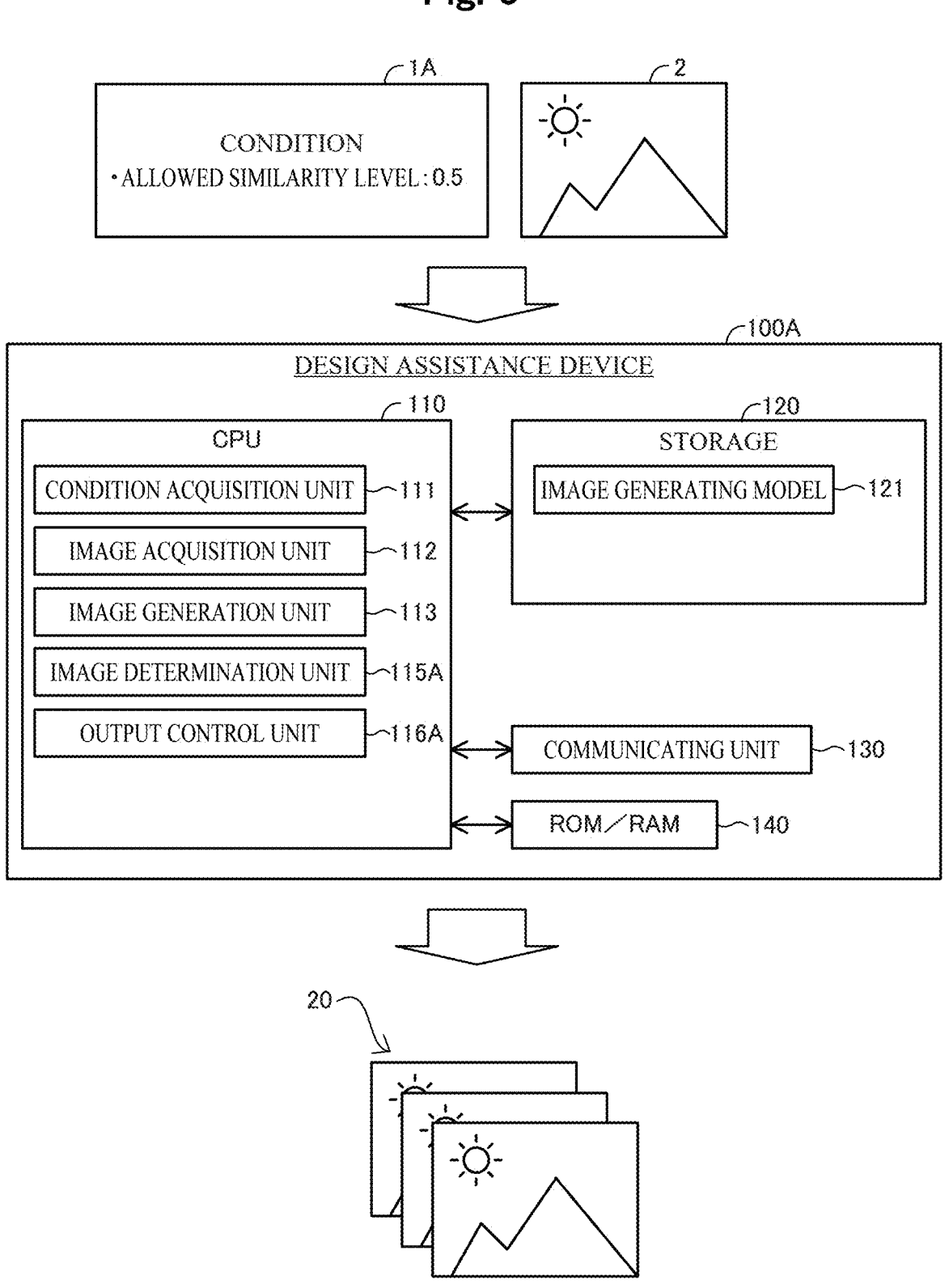
FIG. 5 is a schematic view of a design assistance device according to a second embodiment.

FIG. 5 is a schematic view of a design assistance device 100A according to a second embodiment. The design assistance device 100A according to the second embodiment is different from the first embodiment in the content of a condition 1A designated by a user. The design assistance device 100A according to the second embodiment does not include the impression predicting unit 114 and the impression predicting model 122, but includes an image determination unit 115A instead of the image determination unit 115, and includes an output control unit 116A instead of the output control unit 116.

The condition 1A in the second embodiment includes item content (0.5) representing an allowed similarity level instead of the impression parameter. Here, "allowed similarity level" is a numerical value for defining an allowed similarity level between the initial image 2 and a candidate image 20 generated by the image generation unit 113. In the present embodiment, the allowed similarity level is represented by a numerical value of 0 or more and 1 or less, and represents a state of larger similarity between the initial image 2 and a candidate image 20 as being closer to 0 and represents a state of larger deviation between the initial image 2 and a candidate image 20 as being closer to 1. The condition 1A may include additional conditions c1, c2 (number of image generation; whether candidate images can be similar to each other), just as described in the first embodiment.

FIG. 6 is a flowchart illustrating an example of a processing procedure of image generating processing according to the second embodiment. In image generating processing in the second embodiment, step S16 described with reference to FIG. 2 is not performed, but steps S18A to S22A are performed instead of steps S18 to S22.

In step S18A, the image determination unit 115A performs image determination on the candidate images. Specifically, when a similarity level of the candidate image generated in step S14 with respect to the initial image 2 acquired in step S12 is less than or equal to the allowed similarity level designated by the condition 1A, the image determination unit 115A determines that the candidate image satisfies the condition 1A. The image determination unit 115A may evaluate the similarity level of the images, by using learned perceptual image patch similarity (LPIPS), feature point matching, histogram comparison, etc.

In step S20A, the image determination unit 115A determines whether the candidate image satisfies the condition 1A. When the condition 1A is satisfied (in step S20A: OK), the image determination unit 115A transmits the candidate image to the output control unit 116A, and transitions the processing to step S22A. When the condition 1A is not satisfied in step S20A (in step S20A: NG), the image determination unit 115A transitions the processing to step S14, and repeatedly causes generation of the candidate images by the image generation unit 113 and image determination by the image determination unit 115A. During this process, the image determination unit 115A transmits (feeds back), to the image generation unit 113, a similarity level of the candidate image with respect to the initial image 2. The image generation unit 113 decides the latent variable by using the fed back similarity level in step S14 performed again, thereby generating a candidate image which is close to the item content for the condition 1A.

In step S22A, the output control unit 116A transmits, to the terminal of the user, the candidate image acquired from the image determination unit 115A. As a result, as illustrated in FIG. 5, the candidate image 20 is output to the terminal of the user. In the example of FIG. 5, as a result of inclusion of the additional condition c1 (number of image generation) in the condition 1A, a plurality of (three in the example of the drawing) candidate images 20 are output.

In this way, as the condition 1A, a condition different from the impression parameter may be designated. In addition, prediction of an impression of the candidate image by the impression predicting unit 114 may be omitted. This design assistance device 100A according to the second embodiment can also play the same effect as that of the above-described first embodiment. According to the design assistance device 100A according to the second embodiment, the condition 1A for image generation includes item content representing the similarity level allowed between the initial image 2 and the candidate image 20. For this reason, the image determination unit 115A can determine whether the candidate image 20 satisfies the condition 1A by using the item content. As a result, the design assistance device 100A according to the second embodiment can generate the image 20 having the similarity level designated by the condition 1A.

Third Embodiment

Figure 7:
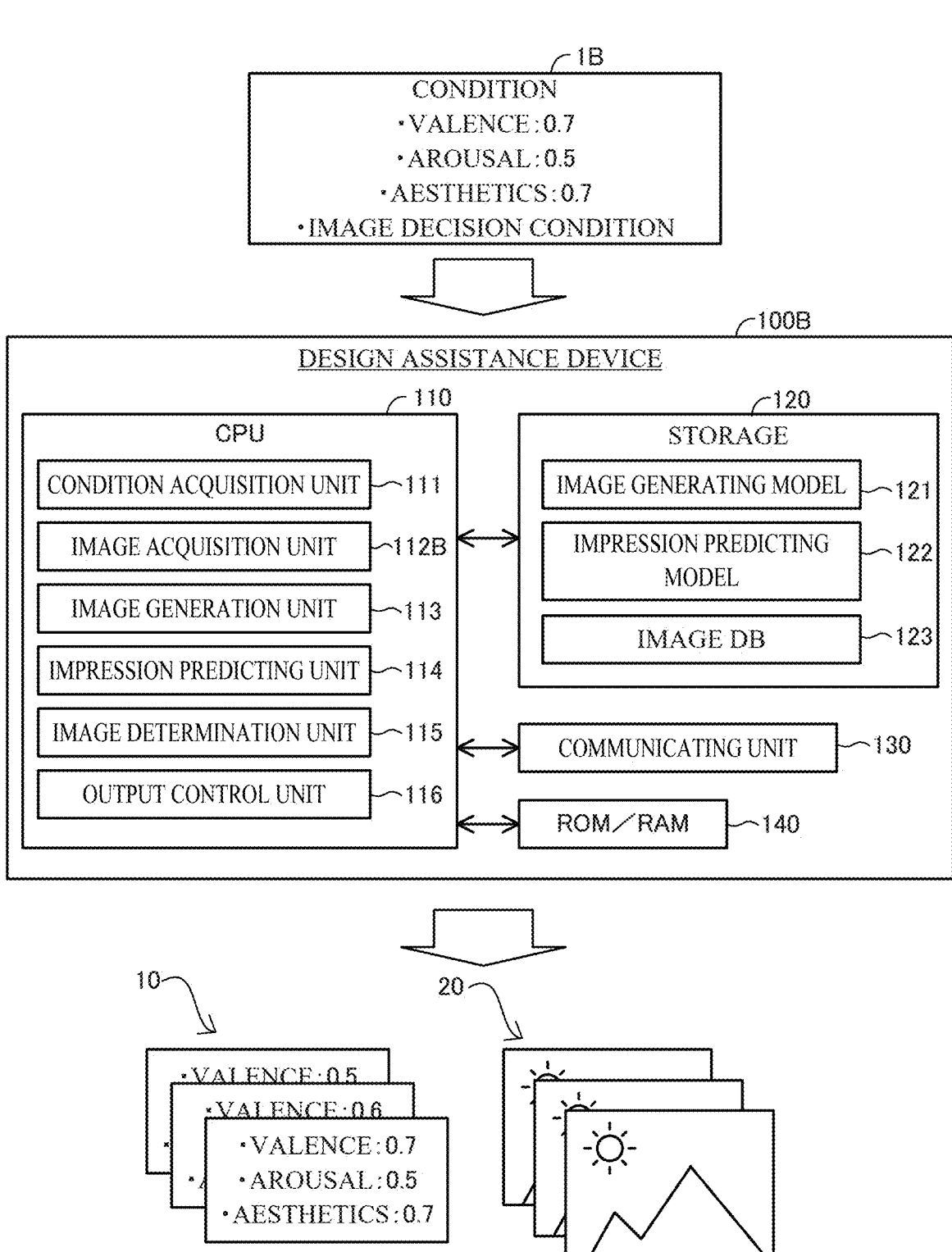
FIG. 7 is a schematic view of a design assistance device according to a third embodiment.

FIG. 7 is a schematic view of a design assistance device 100B according to a third embodiment. The design assistance device 100B according to the third embodiment automatically generates an initial image and acquires the same according to an image decision condition by inclusion of "image decision condition" in a condition 1B designated by a user. In other words, the design assistance device 100B can generate the candidate image 20 without acquiring the initial image 2 from the user. The design assistance device 100B according to the third embodiment includes the image acquisition unit 112B instead of the image acquisition unit 112, and stores the image DB 123 in the storage 120 in advance.

The image decision condition included in the condition 1B according to the third embodiment is a condition used by the design assistance device 100B to generate the initial image. The image decision condition includes one or more conditions characterizing the initial image. The image decision condition can include, for example, a condition designating an object to be disposed in the initial image (e.g., person, thing, feature, etc.), or a condition designating details of the object (e.g., in case of a person, the characteristic of his or her appearance, such as sex, age, etc.).

The image DB 123 is a database used by the image acquisition unit 112B to generate or acquire an image. The image DB 123 stores therein various types of data for generating images, in various modes. Specifically, the image DB 123 may store a plurality of images themselves. The image DB 123 may store a plurality of layer images for representing objects, or a plurality of layer images for representing backgrounds, which are for constituting images.

In step S12 of the image generating processing (FIG. 2), the image acquisition unit 112B searches the image DB 123 by using the image decision condition of the condition 1B acquired in step S10, and generates the initial image 2 by using the images or the layer images stored in the image DB 123. By doing so, without the need to prepare the initial image 2, the user can designate the image to be the initial image by using the image decision condition, which improves the usability. This design assistance device 100B according to the third embodiment can also play the same effect as that of the above-described first embodiment.

Modifications of the Embodiments

The present disclosure is not limited to the above-described embodiments, and can be implemented in various modes within the scope not departing from the essence thereof. For example, a part of the configurations to be realized by hardware may be replaced with software, and conversely, a part of the configurations to be realized by software may be replaced with hardware. In addition, the present disclosure includes the following modifications.

Modification 1

The above-described embodiments respectively describe exemplary configurations of the design assistance devices 100, 100A, and 100B. However, the configuration of the design assistance device 100 is merely an example and any aspect can be adopted therefor. For example, the function of the design assistance device 100 may be realized by cooperation of a plurality of server devices. Specifically, at least a part of the condition acquisition unit 111 to the output control unit 116 may be performed by a certain server and another part thereof may be performed by a different server. Various devices, such as a navigation dedicated device, a game device, a wearable device, may be adopted for the terminal of the user.

Modification 2

In the above-described embodiments, an example of the processing procedures for the image generating processing is described. However, these processing procedures can be changed in various ways. Addition, omission, or modification of the processing content in each step may be made, or an order of performing the steps (procedures) may be changed.

For example, in step S22 of the image generating processing in FIG. 2, outputting of the impression prediction result 10 may be omitted. For example, in steps S22 and S22A in FIGS. 2 and 6, other information may be output in addition to the candidate image 20. Such other information may include distance information (distance information between the impression prediction result and item content of the condition 1) acquired in step S18, or the candidate image which does not satisfy the condition 1 and thus was not adopted, for example.

Modification 3

The configurations of the design assistance devices 100, 100A, and 100B according to the above-described first to third embodiments and the configurations of the design assistance devices 100, 100A, and 100B according to the first and second modifications may be combined as needed. For example, the design assistance device 100 may be configured so that a candidate image which satisfies both of the condition 1 described in the first embodiment and the condition 1A described in the second embodiment is generated. For example, automatic generation of the initial image described in the third embodiment may be adopted in the design assistance device 100B according to the second embodiment.

So far, the present aspect has been described based on the embodiments and modifications. However, the embodiments according to the above-described aspects are intended to facilitate understanding of the present aspect, and do not limit the present aspect. The present aspect may be modified or improved without departing from its essence and the scope of claims, and the present aspect includes such equivalents. If its technical feature is not described as necessary in the present specification, it can be eliminated as needed.

The present disclosure can be realized as the following aspects.

Application Example 1

A design assistance device, comprising:
an acquisition unit that acquires an initial image and a condition for image generation;
an image generation unit that generates a candidate image, being a candidate of an image resulting from changing an impression of the acquired initial image;
an image determination unit that causes the image generation unit to repeatedly generate the candidate image until the candidate image generated by the image generation unit satisfies the condition; and
an output control unit that causes the candidate image which satisfies the condition to be output.

Application Example 2

The design assistance device according to Application Example 1, where
the condition includes a parameter item and item content regarding an impression parameter defining image impression,
the design assistance device further includes: an impression predicting unit that predicts an impression of the candidate image generated by the image generation unit, regarding the parameter item, and
when the impression regarding the parameter item predicted by the impression predicting unit satisfies the item content regarding the parameter item designated by the condition, the image determination unit determines that the candidate image satisfies the condition.

Application Example 3

The design assistance device according to Application Example 1 or Application Example 2, where
the parameter item includes at least one or more of:
valence for defining a qualitative difference of evoked emotion;
arousal for defining a level of physical and cognitive arousal caused by emotion; and
aesthetics for defining a level of aesthetic appearance visually sensed.

Application Example 4

The design assistance device according to any one of Application Example 1 to Application Example 3, where
the output control unit further causes the impression predicted by the impression predicting unit to be output, in addition to the candidate image.

Application Example 5

The design assistance device according to any one of Application Example 1 to Application Example 4, where
the condition further includes a number of generation of the candidate image, and
the image determination unit further causes the image generation unit to repeatedly generate the candidate image until the candidate image which satisfies the condition is generated in number designated by the number of generation.

Application Example 6

The design assistance device according to any one of Application Example 1 to Application Example 5, where
the condition includes item content representing a similarity level allowed between the initial image and the candidate image generated by the image generation unit, and
when a similarity level of the candidate image generated by the image generation unit with respect to the initial image satisfies the item content designated by the condition, the image determination unit determines that the candidate image satisfies the condition.

Application Example 7

A method for assisting in design, where an information processing device performs:

an acquiring process of acquiring an initial image and a condition for image generation;

an image generating process of generating a candidate image, being a candidate of an image resulting from changing an impression of the acquired initial image;

an image determining process of causing repeated generation of the candidate image in the image generating process until the generated candidate image satisfies the condition; and an output controlling process of causing the candidate image which satisfies the condition to be output.

Application Example 8

A computer program causing an information processing device to perform:

an acquiring function of acquiring an initial image and a condition for image generation;

an image generating function of generating a candidate image, being a candidate of an image resulting from changing an impression of the acquired initial image;

an image determining function of causing repeated generation of the candidate image by the image generating function until the generated candidate image satisfies the condition; and an output controlling function of causing the candidate image which satisfies the condition to be output.

DESCRIPTION OF REFERENCE NUMERALS

1, 1A, 1B . . . Condition
2 . . . Initial image
10 . . . Impression prediction result
20 . . . Candidate image
30 . . . Acquisition screen
31 . . . Character input box
32 . . . Image designation button
33 . . . Transmission button
34 . . . Slider bar
40 . . . Circle
100, 100A, 100B . . . Design assistance device
110 . . . CPU
111 . . . Condition acquisition unit
112, 112B . . . Image acquisition unit
113 . . . Image generation unit
114 . . . Impression predicting unit
115, 115A . . . Image determination unit
116, 116A . . . Output control unit
120 . . . Storage
121 . . . Image generating model
122 . . . Impression predicting model
130 . . . Communicating unit
140 . . . ROM/RAM

What is claimed is:

1. A design assistance device comprising:
a processor programmed to:
acquire an initial image and a condition for image generation;

generate a candidate image, being a candidate of an image resulting from changing an impression of the acquired initial image;

repeatedly generate the candidate image until the generated candidate image satisfies the condition; and cause the candidate image which satisfies the condition to be output;

wherein the condition includes a parameter item and item content regarding an impression parameter defining image impression, the processor is further programmed to predict an impression of the generated candidate image, regarding the parameter item, and when the predicted impression retarding the parameter item satisfies the item content regarding the parameter item designated by the condition, the processor determines that the candidate image satisfies the condition;

wherein the parameter item includes at least one or more of: valence for defining a qualitative difference of evoked emotion; arousal for defining a level of physical and cognitive arousal caused by emotion; and aesthetics for defining a level of aesthetic appearance visually sensed.

2. The design assistance device according to claim 1, wherein the processor further causes the predicted impression to be output, in addition to the candidate image.

3. The design assistance device according to claim 1, wherein the condition includes a generation number representing a number of times the candidate image is to be generated, and the processor repeatedly generates the candidate image until the candidate image which satisfies the condition is generated the number of times represented by the generation number.

4. The design assistance device according to claim 1, wherein the condition includes item content representing a similarity level allowed between the initial image and the generated candidate image, and when the similarity level of the generated candidate image with respect to the initial image satisfies the item content designated by the condition, the processor determines that the candidate image satisfies the condition.

5. The design assistance device according to claim 1, wherein the processor further causes the predicted impression to be output, in addition to the candidate image.

6. The design assistance device according to claim 1, wherein in repeatedly generating the candidate image, the processor generates a plurality of candidate images that are different in impression from each other and different in impression from the acquired initial image.

7. The design assistance device according to claim 1, wherein the candidate image is output so as to be displayed in association with the acquired initial image.

8. The design assistance device according to claim 1, wherein the initial image is acquired from a user via designation of the initial image by the user.

9. The design assistance device according to claim 1, wherein the initial image is acquired from an image database via designation of an image decision condition by a user.

10. A method for assisting in design, using an information processing device, the method comprising:

acquiring an initial image and a condition for image generation;

generating a candidate image, being a candidate of an image resulting from changing an impression of the acquired initial image;

repeatedly generating the candidate image until the generated candidate image satisfies the condition; and causing the candidate image which satisfies the condition to be output;

wherein the condition includes a parameter item and item content regarding an impression parameter defining image impression, the processor is further programmed to predict an impression of the generated candidate image, regarding the parameter item, and when the predicted impression retarding the parameter item satisfies the item content regarding the parameter item designated by the condition, the processor determines that the candidate image satisfies the condition;

wherein the parameter item includes at least one or more of: valence for defining a qualitative difference of evoked emotion; arousal for defining a level of physical and cognitive arousal caused by emotion; and aesthetics for defining a level of aesthetic appearance visually sensed.

11. A non-transitory computer-readable medium storing thereon a computer program causing an information processing device to perform:

acquiring an initial image and a condition for image generation;

generating a candidate image, being a candidate of an image resulting from changing an impression of the acquired initial image;

repeatedly generating the candidate image until the generated candidate image satisfies the condition; and causing the candidate image which satisfies the condition to be output;

wherein the condition includes a parameter item and item content regarding an impression parameter defining image impression, the processor is further programmed to predict an impression of the generated candidate image, regarding the parameter item, and when the predicted impression retarding the parameter item satisfies the item content regarding the parameter item designated by the condition, the processor determines that the candidate image satisfies the condition;

wherein the parameter item includes at least one or more of: valence for defining a qualitative difference of evoked emotion; arousal for defining a level of physical and cognitive arousal caused by emotion; and aesthetics for defining a level of aesthetic appearance visually sensed.

* * * * *